(12) United States Patent
Johnson et al.

(10) Patent No.: US 11,333,562 B1
(45) Date of Patent: May 17, 2022

(54) DYNAMIC SET POINT TEMPERATURE ADJUSTMENT TECHNIQUES

(71) Applicant: Alarm.com Incorporated, Tysons, VA (US)

(72) Inventors: Kyle Rankin Johnson, Falls Church, VA (US); William Wireko Mensah, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 683 days.

(21) Appl. No.: 16/162,868

(22) Filed: Oct. 17, 2018

Related U.S. Application Data

(60) Provisional application No. 62/576,853, filed on Oct. 25, 2017.

(51) Int. Cl.
*G01K 13/20* (2021.01)
*G05B 15/02* (2006.01)
*G05D 23/19* (2006.01)

(52) U.S. Cl.
CPC ............ *G01K 13/20* (2021.01); *G05B 15/02* (2013.01); *G05D 23/1928* (2013.01); *G05B 2219/2642* (2013.01)

(58) Field of Classification Search
CPC .................. G01K 13/20; G05B 15/02; G05B 2219/2642; G05D 23/1928
USPC .................. 219/490, 494, 497; 600/301, 388
See application file for complete search history.

(56) References Cited

U.S. PATENT DOCUMENTS 9,990,172 B2 * 6/2018 Komaromi ......... A61B 5/14517
2013/0281795 A1 10/2013 Varadan

FOREIGN PATENT DOCUMENTS

WO    2019148239    8/2019

* cited by examiner

*Primary Examiner* — Phuong T Nguyen
(74) *Attorney, Agent, or Firm* — Fish & Richardson P.C.

(57) ABSTRACT

Techniques are described for using temperature data collected by wearable remote temperature sensor (WRTS) to augment temperature monitoring and adjustment by a temperature regulating device (TRD) within a property and thereby improving user comfort. In some implementations, a determination that a user is located within a property is made. A current body temperature of the user measured by a temperature sensor worn by the user is obtained. A reference body temperature of the user indicated by historical temperature data collected for the user is obtained. As determination to adjust to a set point temperature of a temperature regulating device located within the property is made. An instruction is then provided for out to the temperature regulating device that, when received, causes the temperature regulating device to adjust the set point temperature of the temperature regulating device in accordance with the determined adjustment.

8 Claims, 8 Drawing Sheets

600

```
┌─────────────────────────────────────────────────────────────┐
│  OBTAIN SENSOR DATA COLLECTED BY A WEARABLE REMOTE          │
│  TEMPERATURE SENSOR THAT INDICATES A MEASURED TEMPERATURE OF│
│                        A USER                          610  │
└─────────────────────────────────────────────────────────────┘
```
```
┌─────────────────────────────────────────────────────────────┐
│  OBTAIN REFERENCE DATA INDICATING A PREDETERMINED BASELINE  │
│           BODY TEMPERATURE FOR THE USER                     │
│                                                        620  │
└─────────────────────────────────────────────────────────────┘
```
```
┌─────────────────────────────────────────────────────────────┐
│  DETERMINE AN ADJUSTMENT TO A SET POINT TEMPERATURE OF A    │
│  TEMPERATURE REGULATING DEVICE OF A PROPERTY BASED ON THE   │
│       SENSOR DATA AND THE REFERENCE DATA               630  │
└─────────────────────────────────────────────────────────────┘
```
```
┌─────────────────────────────────────────────────────────────┐
│    ADJUST THE SET POINT TEMPERATURE OF THE TEMPERATURE      │
│  REGULATING DEVICE ACCORDING TO THE DETERMINED ADJUSTMENT   │
│                                                        640  │
└─────────────────────────────────────────────────────────────┘
```

DETERMINE THAT A USER IS LOCATED WITHIN A PROPERTY
710

OBTAIN A CURRENT BODY TEMPERATURE OF A USER
720

OBTAIN A REFERENCE BODY TEMPERATURE OF THE USER
730

DETERMINE AN ADJUSTMENT TO A SET POINT TEMPERATURE OF A TEMPERATURE REGULATING DEVICE LOCATED WITHIN THE PROPERTY
740

PROVIDE AN INSTRUCTION THAT CAUSES THE TEMPERATURE REGULATING DEVICE TO ADJUST THE SET POINT TEMPERATURE IN ACCORDANCE WITH THE DETERMINED ADJUSTMENT
750

FIG. 7

DYNAMIC SET POINT TEMPERATURE ADJUSTMENT TECHNIQUES

CROSS-REFERENCE TO RELATED APPLICATION

This application claims the benefit of U.S. Provisional Patent Application No. 62/576,853 filed on Oct. 25, 2017 and entitled "DYNAMIC SET POINT TEMPERATURE ADJUSTMENT TECHNIQUES," which is incorporated herein by reference in its entirety.

TECHNICAL FIELD

This disclosure relates to home monitoring technology.

BACKGROUND

Monitoring systems often include a temperature regulating device (TRD) such as thermostat. The TRD can be used to manually or automatically adjust the air temperature of a property. For example, a user can use the thermostat to manually adjust a set point temperature for a heating, ventilation, and air conditioning (HVAC) system of the property. In other examples, a thermostat can be configured to automatically increase or decrease set point temperature based on a temperature detected by temperature sensors placed within the property. Data collected by the TRD can be used to maintain a specified temperature so that if the measured temperature rises or falls outside the desired threshold, the TRD activates a cooling or heating mode of the HVAC system to adjust the temperature accordingly. In some instances, monitoring systems include stand-alone temperature sensors such as remote temperature sensors (RTS), which provide a TRD with temperature measurements in different regions of a property.

SUMMARY

Although many monitoring systems can adjust the air temperature within a property based on temperature readings collected by RTS, these adjustments may not entirely improve the comfort level of users that are located within the property. For example, an adjustment that reduces the set point temperature by a certain value may not improve the comfort level of a user that perceives the air temperature to be warmer than the actual temperature. In other examples, a user's comfort level may change over time, e.g., during times of physical activity, after gaining or losing weight, or after seasonal weather changes. In this regard, monitoring systems that adjust the set point temperature of a TRD based on measured air temperature only are often inadequate to improve the user's comfort level.

Accordingly, techniques are described for using temperature data collected by wearable RTS (WRTS) to augment temperature monitoring and adjustment by a TRD within a property and thereby improving user comfort. For example, the WRTS can be worn on any part of the user's body and measure a temperature of the user such as outside body temperature. A monitoring system may aggregate the user temperature and the air temperature within the property and configure the TRD to adjust the set point temperature based on the aggregated data. In this regard, because temperature adjustment is based on a monitored temperature of the user, which may be more likely to represent user comfort level than air temperature, a temperature adjustment based on the aggregated data may be more likely to improve a user's comfort level compared to a temperature adjustment based on air temperature only.

A monitoring system described within this application can generally include a TRD that monitors and regulates a set point temperature within a property, one or more WRTS that monitors temperatures of users that wear the WRTS, and/or other electronic devices such as sensors, cameras, etc., and a control unit that controls aspects of monitoring operations performed by the system. The monitoring system can also include an associated server system, a geo-fence, among other electronic devices discussed in detail below.

In general, the architecture of the system enables dynamic adjustment of set point temperature based on a measured air temperature within the property and a measured temperature for a user. Using techniques described herein, the system can adjust the set point temperature in a manner that provides improved user comfort. For example, as discussed below, the measured user temperature can be used to identify temperature sensitivities of the user and then adjust the set point temperature to accommodate those temperature sensitivities. In this regard, the system regulates interior temperature within the property based on both detecting changes to air temperature as well as detecting changes to the temperature of the user.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 6 illustrates an example of a process for adjusting a set point temperature of a property based on a user temperature measured by a WRTS.

FIG. 7 illustrates an example of a process for adjusting a set point temperature based on a current body temperature of a user and a reference body temperature of the user.

In the drawings, like reference numbers represent corresponding parts throughout.

DETAILED DESCRIPTION

In general, techniques are described for using temperature data collected by WRTS to augment temperature monitoring and adjustment by a TRD within a property and thereby allow adjustment to improve user comfort. For example, the WRTS can be worn on any part of the user's body and measure a temperature of the user such as body temperature. A monitoring system may aggregate the user temperature and the air temperature within the property and configure the TRD to adjust the set point temperature based on the aggregated data. In this regard, because temperature adjustment is based on a monitored user temperature, which may be more likely to represent user comfort level than air temperature, a temperature adjustment based on the aggregated data may be more likely to improve a user's comfort level compared to a temperature adjustment based on air temperature only.

As described throughout, a "user temperature" refers to a temperature measured by a WRTS that is worn by the user. In some instances, the "user temperature" refers to an external body temperature measured on an extremity when the WRTS is placed on the extremity, for example, a measured outside body temperature when the WRTS is placed on a user's fingers, wrist, arms, legs, foot, etc. In other instances, the "user temperature" refers to a measured temperature indicative of core body temperature that measured by a WRTS that is placed inside a cavity. For example, a WRTS can be a probe that is placed inside a user's ear, mouth, or underneath the user's armpits. Additionally, the user temperature can be measured using any suitable temperature measurement technique, such as temporal measurement and/or tympanic measurement.

As described throughout, "real-time" refers to information or data that is collected and/or processed instantaneously with minimal delay after the occurrence of a specified event, condition, or trigger. For instance, "real-time data" refers to data, e.g., temperature data, that is processed with minimal delay after a WRTS collects or senses the data, e.g., using a temperature sensing element. The minimal delay in collecting and processing the collected data is based on a sampling rate or monitoring frequency of the WRTS, and a time delay associated with processing the collected data and transmitting the processed data to a receiving device. As an example, a WRTS measures the user temperature in real-time to monitor changes in the user temperature over time and/or compare the measured user temperature to a baseline temperature for the user. The system processes each data packet received from the WRTS to monitor the user temperature.

Figure 1:
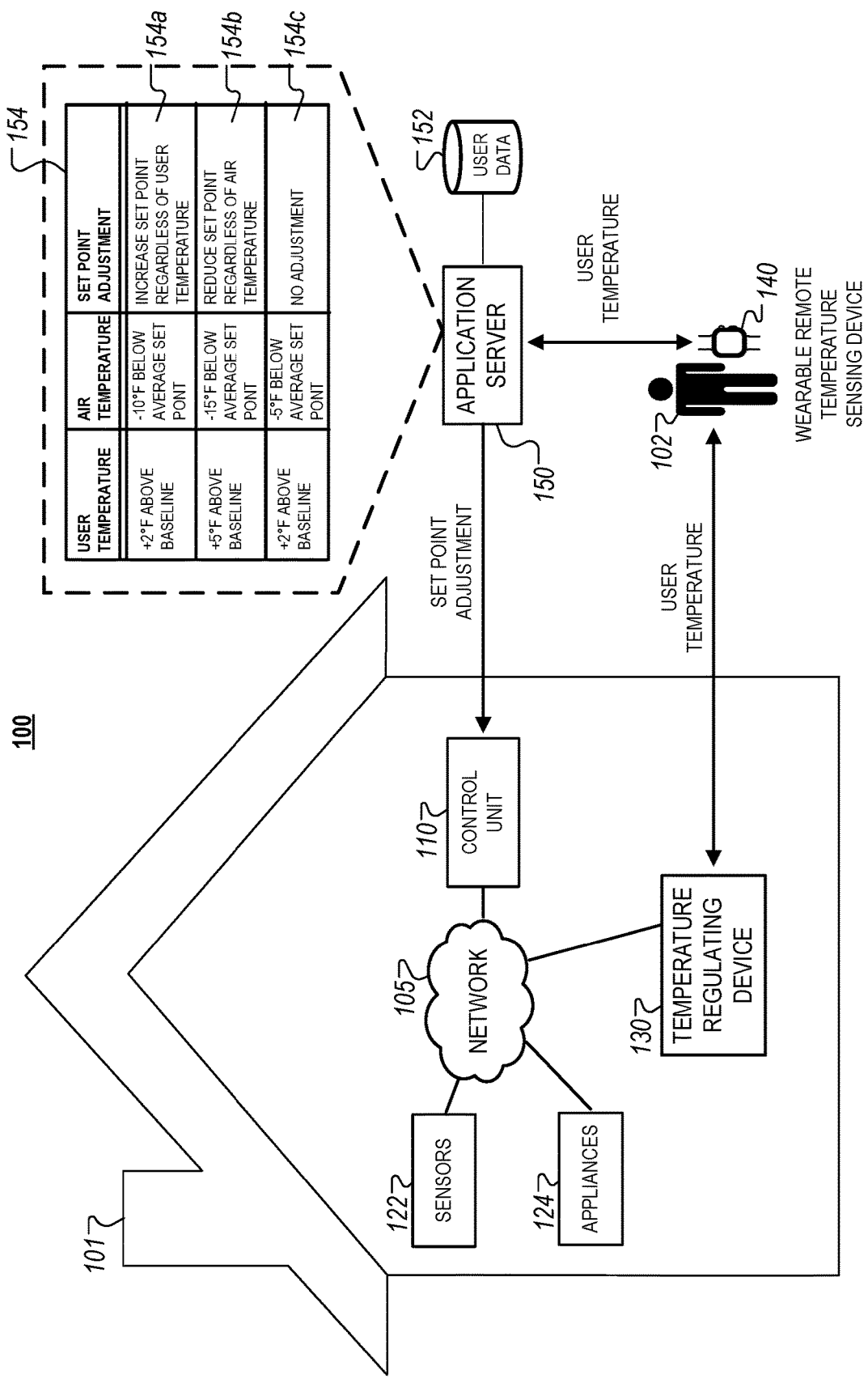
FIG. 1 illustrates an example of a system that is capable of using a user temperature to adjust a set point temperature of a property.

FIG. 1 illustrates an example of a system 100 that is capable of adjusting a set point temperature of a property based on a measured user temperature. The system 100 can include a control unit 110, sensors 122, appliances 124, a TRD 130, a WRTS 140, and an application server 150 that exchange communications over a network 105. The system 100 is installed within a property 101 where the control unit 110, the sensors 122, the appliances 124, the TRD 130, and the WRTS 140 are located.

In general, architecture of the system 100 enables dynamic adjustment of set point temperature based on a measured air temperature within the property 101 and a measured user temperature for a user 102. Using techniques described herein, the system 100 can adjust the set point temperature in a manner that provides improved user comfort. For example, as discussed below, the measured user temperature can be used to identify temperature sensitivities of the user 102 and then adjust the set point temperature to accommodate those temperature sensitivities. In this regard, the system 100 regulates interior temperature within the property 101 based on both detecting changes to air temperature as well as detecting changes to the user temperature of the user 102.

In operation, the system 100 initially identifies a baseline user temperature (or reference user temperature) for the user 102. For example, once installed in the property 101, the system 100 monitors the user temperature measured by the WRTS 140 for a specified time period (e.g., one week). The system 100 determines the baseline user temperature for the user 102 based on, for example, measuring an average user temperature over the specified time period, identifying fluctuations attributed to user activity, time-of-day, etc., removing any sensor detection errors.

Once the baseline user temperature is determined, the system 100 uses the monitoring techniques described herein to detect any deviations that may cause the user discomfort. As discussed below, the identified deviations in measured user temperature from the baseline user temperature can be processed in parallel with changes in air temperature to dynamically adjust the set point temperature to improve user comfort. For example, if the measured air temperature within the property 101 is equal to the current set point temperature, but the measured user temperature exceeds the baseline temperature beyond a threshold amount, then the system 100 can reduce the set point temperature to reduce the air temperature within the property 101 (even though it currently matches the current set point temperature). In some implementations, the system 100 is also capable of processing other types of data, such as user activity data, occupancy data, etc., to identify a context associated with deviations in measured user temperature. In such implementations, the identified context can further be used to augment set point temperature adjustment to improve user comfort. For example, if activity data indicates that a user is exercising while the measured user temperature is increasing, then a change to the set point temperature may not be as dramatic if the activity data indicates that the user is stationary. In this regard, the identified context can be used as an indicator to determine the appropriate level of adjustment based on a specific type of cause attributed to changes in user temperature.

Referring now to the components of the system 100, the network 105 may be configured to enable electronic communications between electronic devices. For example, the network 105 may be configured to enable exchange of electronic communications between the control unit 110, the sensors 122, the appliances 124, the TRD 130, the WRTS 140, and the application server 150. The network 105 may include Local Area Networks (LANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), or other comparable technologies. In some examples, the network 105 may include wide area networks (WAN) of computers that receive services provided by a service provider.

The control unit 110 can be a computing device that controls aspects of monitoring operations performed by the components of the system 100. The control unit 110 can include a controller and a network module. The controller can be configured to control, for example, temperature monitoring and adjustment by the TRD 130. In some examples, the controller includes a processor or other control circuitry configured to execute instructions of a program that controls operation of the system 100. In these examples, the controller can be configured to receive input from sensors, detectors, or other devices associated with the system 100 and control operation of components of the system 100, such as a camera, a temperature sensor, an activity sensor, HVAC components, etc. For example, the controller may be configured to control operation of the network module included in the control unit 110.

The network module of the control unit 110 can be a communication device configured to exchange communications over the network 105. The network module can be a wireless communication module configured to exchange wireless communications over the network 105. For example, the network module can be a wireless communication device configured to exchange communications over a short-range wireless network. The network module can also be configured to exchange communications over the network 105 using a wireless connection. For instance, the network module can enable the control unit 110 to exchange communications with the application server 150 over the network 105 without the use of the network 105. The wireless communication device can include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi.

The network module can also may be a wired communication module configured to exchange communications over the network 105 using a wired connection. For instance, the network module can be a modem, a network interface card, or another type of network interface device. The network module can be an Ethernet network card configured to enable the control unit 110 to communicate over a local area network and/or the Internet. The network module can also be a voiceband modem configured to enable an alarm panel to communicate over the telephone lines of Plain Old Telephone Systems (POTS). In some implementations, the alarm panel may be a broadband or cellular gateway where the network module may enable the control unit 110 to communicate over the network 105.

The control unit 110 can communicate with the sensors 122, the appliances 124, the TRD 130, the WRTS 140, and the application server 150 to wirelessly transmit data generated from the sensors 122, the appliances 124, the TRD 130 and the WRTS 140 over the network 105. In some instances, the control unit 110 may periodically receive data activity reports from the sensors 122, the appliances 124, the TRD 130 and/or the WRTS 140 that include information related to the property, e.g., occupancy data, activity data, movement data, temperature data, among others.

In addition, the control unit 110 can periodically receive temperature data collected by the TRD 130 and the WRTS 140. For example, the control unit 110 can receive temperature data from the TRD 130 that indicates a measured air temperature within the property 101, and temperature data from the WRTS 140 that indicates a measured user temperature when the WRTS 140 is worn by the user. As discussed below, the control unit 110 can process the received temperature data to configure the operation of the TRD 130. For example, the control unit 110 can use the received temperature data to configure set point temperature adjustment by the TRD 130.

The sensors 122 may include various types of sensors that are placed within a property. For example, the sensors 122 can include a contact sensor, a motion sensor, a glass break sensor, an occupancy sensor, an activity sensor, or any other type of sensor that is typically included in a monitoring system or security system. The sensors 122 also can also include environmental sensors such as an ambient temperature sensor, a water sensor, a rain sensor, a wind sensor, a light sensor, a smoke detector, a carbon monoxide detector, an air quality sensor, etc. In some instances, the sensors 122 may include a radio-frequency identification (RFID) sensor that identifies a particular article that includes a pre-assigned RFID tag.

The appliances 124 can be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some instances, the appliances 124 may periodically transmit information and/or generated data to the control unit 110 such that the control unit 110 can automatically control the operation of the appliances 124 based on the exchanged communications. For example, the control unit 110 can operate one or more of the appliances 124 based on a fixed schedule specified by the user. In another example, the control unit 110 may enable or disable one or more of the appliances 124 based on received sensor data from the sensors 122.

The TRD 130 can be a dynamically programmable temperature regulator, e.g., a thermostat that is configured to monitor air temperature within one or multiple regions within the property 101. In some instances, the TRD 130 is an integrated component of temperature monitoring device that that receives user input indicating a set point temperature that is transmitted to the control unit 110 and/or a HVAC system of the property 101. In other instances, the TRD 130 can be a separate aftermarket device that is configured to exchange data communications with the system 100 using a data transmission protocol.

In some implementations, the TRD 130 is configured to receive data indicating a set of user preferences related to energy consumption of the HVAC system or temperature comfort within the property 101. For example, the TRD 130 may be used to control the air temperature of the property 101 based on a set of programmable operations based on the data indicating the set of user preferences, e.g., rules specified within a set point temperature rule repository.

The TRD 130 is configured to control the operations of a HVAC system of the property 101 to regulate and/or adjust the air temperature within the property 101. For example, the TRD 130 can transmit control signals to enable and/or disable cooling/heating operations of the HVAC system. The HVAC system can be a control system within the property 101 that includes one or more components that perform operations related to thermal comfort, ventilation, indoor air quality and infiltration monitoring, and/or pressure maintenance. In some implementations, the HVAC system is also configured to monitor energy consumption of individual system components, for example, by directly measuring the energy consumption of the HVAC system components or by estimating the energy usage of the one or more HVAC system components based on detecting usage of components of the HVAC system.

The WRTS 140 can be any type of portable electronic device that includes a temperature sensor for measuring a user temperature as discussed throughout. The WRTS 140 can be placed on different areas of a user's body to allow the measurement of user temperature using temporal measurement and/or tympanic measurement. In some instances, the WRTS 140 is placed on a user's extremity such as a user's fingers, wrist, arms, legs, foot, etc., enabling the measurement of an outside body temperature of the user. In other instances, the WRTS 140 is a probe that can be inserted within a cavity to enable the measurement of a core body temperature of the user. For example, the WRTS 140 can be earphones that include a temperature sensor that is in contact with a user's ear canal to allow for temporal measurement of the user's core body temperature, as measured within the user's ear canal.

The WRTS 140 can also have different form factors based on the location of the user's body from which the user temperature is measured. For example, the WRTS 140 can be smart glasses that measures a user's outside body temperature behind the user's ears, a smart watch or bracelet that measures a user's outside body temperature near the user's wrists, necklace pendants that measure a user's outside body temperature near the user's neck, or earphones that measure the user's core body temperature inside the user's ear canal.

The WRTS 140 can be configured to measure user temperature of a user 102 over different time intervals and/or different frequencies. In some instances, the WRTS 140 measures user temperature in real-time and transmits the measured user temperature to the control unit 110, the TRD 130 and/or the application server 150 to allow dynamic real-time set point temperature by the TRD 130. For example, changes in user temperature resulting from changes in user activity can be used to inform the TRD 130 to adjust the set point temperature to improve user comfort within the property 101. In other instances, the WRTS 140 measures user temperature periodically at specified time intervals, e.g., every thirty minutes, to conserve computational and power resources associated with performing temperature measurement. In such instances, the measured user temperature is periodically transmitted to the control unit 110, the TRD 130, and/or the application server 150 to periodically adjust the set point temperature by the TRD 130.

In some implementations, the WRTS 140 can be an activity tracker that performs other operations unrelated to temperature measurement. For example, the WRTS 140 can be an activity tracker that monitors user activity data such as biometric data, fitness data, sleep data, user input data, or any other type of quantitative data. In such implementations, the WRTS 140 can include different types of embedded sensors to measure various types of biometric data such as heart rate or rhythm, breathing rate, blood oxygen level, blood pressure, skin temperature, skin moisture, etc. The WRTS 140 can also include hardware components such as an accelerometer, a gyroscope, a microphone, a camera, image sensors, video sensors, sound sensors, and/or an automated speech recognizer.

In some implementations, the WRTS 140 can function independently of the components of the property 101. For example, when a user 102 wearing the WRTS 140 is located outside of the property 101, the WRTS 140 may be capable of operating independently of the control unit 110 and/or the TRD 130 to measure and/or monitor a user temperature of the user 102. The monitored user temperature can be transmitted to the application server 150 using a different network connection than the network 105, e.g., a cellular-based network that enables the WRTS 140 to access the Internet.

The application server 150 can be an electronic device configured to provide monitoring services by exchanging electronic communications with the control unit 110, the TRD 130, and/or the WRTS 140 over the network 105. For example, the application server 150 can be configured to monitor events, e.g., a measured user temperature satisfying a threshold, generated by the control unit 110 and/or other devices connected over the network 105. In this example, the application server 150 may exchange electronic communications with the network module included in the control unit 110 to receive information regarding events detected by the control unit 110. The application server 150 can also receive information regarding events from the WRTS 140, e.g., a measured user temperature while the user is exercising outside of the property 101.

The application server 150 can store data that is used to perform set point temperature adjustment in the manner discussed throughout. For example, the application server 150 stores user data 152 that includes a reference user temperature for the user 102, a user-specified optimal temperature air temperature within the property 101, among other types of user preferences, e.g., preferred temperatures at different times during the day, preferred energy consumption levels, etc. The reference user temperature represents an average user temperature for the user 102 that is indicated based on historical temperature data collected by the WRTS 140.

The application server 150 also stores a rule repository 154 that includes different rules that each configure the TRD 130 to perform a specific type of set point temperature adjustment specified by a particular rule. For example, different rules within the rule repository 154 can specify different magnitudes to change the present set point temperature. Additionally, the rules can each specify one or more triggers and/or conditions associated with measured air temperature within the property 101 or measured user temperature of the user 102 that allow the components of the system 100 to perform selection to perform a set point temperature adjustment according to the selected rule. For example, the components of the system 100 can select a rule from the rule repository 154 if a measured air temperature and/or a measured user temperature satisfies a trigger and/or condition associated with a rule.

The rule repository 154 can include different types or classifications of rules. For example, the rule repository 154 can include general rules that are applicable to all users, e.g., rules that specify set point temperature adjustment irrespective of a measured user temperature. The rule repository 154 can also include user-specific rules that are customized for each user, e.g., rules that specify set point temperature adjustment based on a comparison of a measured user temperature for the user 102 to a baseline user temperature for the user 102.

In the examples depicted in FIG. 1, the rule repository 154 includes three rules 154*a*, 154*b*, and 154*c* that each specify a type of set point temperature adjustment based on a user temperature measured by the WRTS 140 and an air temperature measured by the TRD 130. In these examples, the rules 154*a*-*c* are rules that are applied customized for a predetermined baseline user temperature for the user 102 and an average set point temperature for the property 101.

For example, if the user temperature is measured to be two degrees above the baseline and the air temperature is measured to be ten degrees below the average set point, then rule 154*a* specifies increasing a set point temperature regardless of the measured user temperature. In this example, because the air temperature has deviated so greatly from the average set point temperature, the system 100 determines that this is the key metric for adjusting the set point temperature since the change in user temperature is so small. In contrast, if the user temperature is measured to be five degrees above the baseline and the air temperature is measured to be fifteen degrees below the average set point, then rule 154b specifies decreasing the set point temperature regardless of the measured air temperature. In this example, because the user temperature has deviated so greatly from the baseline, the system 100 determines that this is the key metric for adjusting the set point temperature. In the third example, if the user temperature is measured to be two degrees above the baseline and the air temperature is measured to be five degrees below the average set point, then rule 154c specifies no change to the set point temperature because neither the measured user temperature or the measured air temperature sufficiently deviate from the baseline or the average set point temperature to satisfy a respective threshold.

Although FIG. 1 illustrates the user data 152 and the rule repository 154 being stored remotely on the application server 150, in some implementations, this data can be stored locally, for example, on the control unit 110 and/or the TRD 130. In such implementations, the dynamic set point adjustment techniques discussed herein can be performed locally by the control unit 110 and/or the TRD 130 without network connectivity to the application server 150. Additionally, in some implementations, the TRD 130 can be integrated into the control unit 110 such that the functions performed by the TRD 130, as discussed throughout, can be performed by the control unit 110, which is also capable of monitoring and/or regulating the air temperature within the property 101.

In some implementations, the WRTS 140 is capable of determining the user temperature based on inferences made from biometric data collected from the user 102. In such implementations, the WRTS 140 uses the user temperature determined using such inferences additionally, or alternatively, to the user temperature measured using a temperature sensing techniques as discussed above. The WRTS 140, in such implementations, can be an electronic device that does not include a temperature sensor, but is capable of determining the user temperature applying regression-based techniques that use a known correlation between a particular measured biometric parameter and a user's body temperature to predict the user temperature. For example, the WRTS 140 can use sequential heart rate measurements to estimate a core body temperature of the user 102. In this example, any activity-based sensor, e.g., a fitness tracking device, can be used as the WRTS 140 as discussed throughout this document. The WRTS 140, in such implementations, can function even without being attached to or worn by the user because another device that is nearby the user 102, such as a user device, may collect biometric measurements and then transmit the measurements to the WRTS 140.

Another example of a body metric that can be used to measure the user temperature is a measured perspiration level for the user 102. For example, the WRTS 140 can measure the current perspiration level and/or the rate at which the perspiration level is changing to determine the energy used by the user's body in cooling the user and/or how much of that work could be potentially alleviated if the ambient air temperature was reduced. Such data can be used to determine the appropriate level of temperature adjustment as discussed above. For example, if the user reports that he/she is feeling hot but not sweating, the set point temperature adjustment may not be as aggressive as if the user reported to be hot and sweating. In some instances, the WRTS 140 can be capable of detecting the source of perspiration, e.g., sweaty palms, dry face, to treat temperature adjustment differently based on the source of perspiration, which are used as indicators of a user's comfort level.

In some implementations, the system 100 solicits feedback from the user 102 at different time points of the temperature adjustment procedure discussed above to improve the quality of temperature adjustment and/or customize the adjustment in different circumstances according to a user's preferences. For example, once the system 100 has performed an automated set point temperature adjustment, the system 100 may provide a short survey to a device of the user 102 to determine the user's reported comfort level. In this example, positive responses submitted by the user 102 in response to a set point adjustment can be used to determine whether the level of adjustment was appropriate based on the measured user temperature. As another example, the system 100 may periodically ask the user to indicate his/her preferences to identify changes to user preferences in relation to other environmental factors such as time-of-day, seasonal changes, or different weather conditions. In this regard, feedback provided by the user 102 can be used to generate user profile data that is then stored within the user data 152. In some instances, the user feedback is used to create new set point temperature adjustment rules within the rule repository 154 and/or modify existing set point temperature adjustment rules to be consistent with the feedback received from the user 102.

Figure 2:
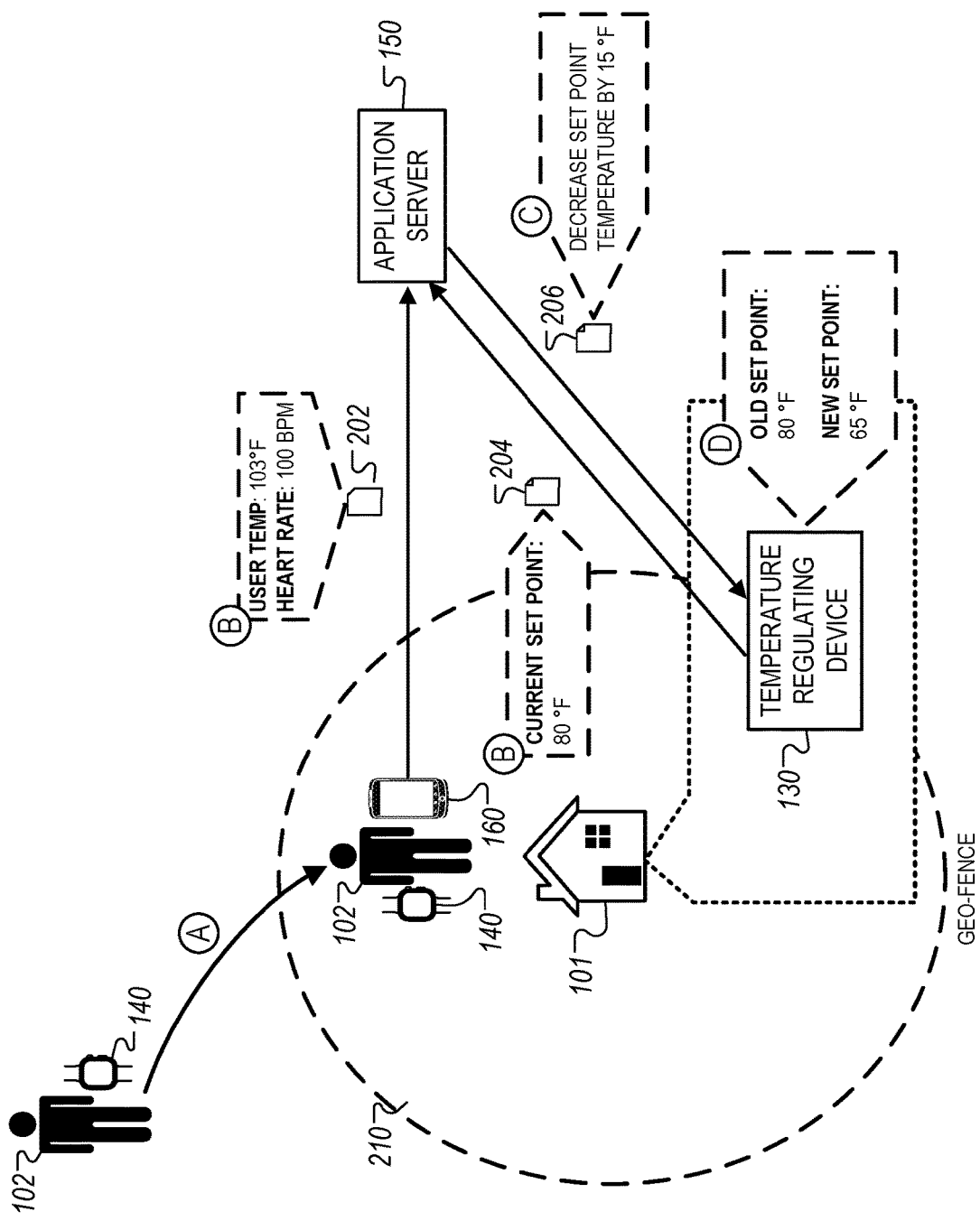
FIG. 2 illustrates an example of a technique for configuring a TRD based on temperature data collected by a WRTS in relation to a user's location within or outside a geo-fence.

FIG. 2 illustrates an example of a technique for configuring the TRD 130 based on temperature data collected by the WRTS 140 in relation to a user's location within or outside a geo-fence 210. In the example depicted, a user temperature is measured by the WRTS 140 while the user 102 is located outside the property 101. The measured user temperature is then used to adjust the set point temperature of the property 101 to a specified value determined based on the measured user temperature before the user 102 reaches home so that the temperature variation perceived by the user 102 as he/she enters the property 101 is minimized, thereby improving user comfort as the user 102 re-enters the property.

As shown in FIG. 2, the set point adjustment is performed with the use of the geo-fence that is associated with the property 101. The geo-fence 210 specifies a virtual boundary, defined either by a global positioning system (GPS) signal or a radio-frequency identification (RFID) signal associated with a user device 160 of the user 102. The geo-fence 210 allows components of the system 100, e.g., the control unit 110, the TRD 130, and/or the application server 150, to determine when the user device 160 enters or leaves a particular area associated with the property 101 and defined by the virtual boundary.

The example of the set point adjustment depicted in FIG. 2 proceeds according a set of steps identified in the figure with letters "A," "B," "C," and "D." At step "A," the system 100 determines that the user device 160 has entered the geo-fence 210. As discussed above, this determination can be made by one or more of the control unit 110, the TRD 130, or the application server 150 and based on, for example, GPS data collected by the user device 160. This determination is also used as a trigger indicating that the user 102 is likely to come home within a certain time period.

At step "B," the application server 150 obtains the sensor data 202 collected by the WRTS 140 and transmitted by the user device 160. The application server 150 also obtains set point data 204 from the TRD 130.

The sensor data 202 includes a user temperature measured by the WRTS 140 for the user 102. As discussed above, this temperature can be measured in real-time, or alternatively, periodically over a specified time period after the user 102 is determined to have entered the geo-fence 210. The sensor data 202 can also include biometric indicators that are measured by the WRTS 140, such as a heart rate for the user 102. The set point data 204 identifies a current set point temperature set for the property 101 by the TRD 130. In the example depicted, the sensor data 202 transmitted to the application server 150 indicates that the measured user temperature is 103 degrees Fahrenheit and the measured heart rate is 100 beats per minute (BPM). Other examples of biometric indicators can include perspiration level, breathing rate, skin moisture level, among others. Additionally, the set point data 204 indicates that the current set point temperature within the property 101 is 80 degrees Fahrenheit.

The sensor data 202 can be exchanged between the WRTS 140 and the user device 160 using any suitable wireless communication protocol, such as Bluetooth pairing, infrared (IR) transmission, among others. In the example depicted in FIG. 2, the WRTS 140 is a wearable device with limited or no network connectivity and so sensor data 202 is transmitted via the user device 160. In other implementations, the WRTS 140 can be a fully capable network-enabled computing device that has sufficient processing capabilities to transmit the sensor data 202 directly to the application server 150 without exchanging the collected data with the user device 160 and/or the control unit 110.

At step "C," the application server 150 processes the sensor data 202 and the set point data 204 to determine if a set point temperature adjustment is necessary. If the application server 150 determines that an adjustment is necessary, as shown in the example depicted in FIG. 2, the application server 150 determines the specific type of adjustment, e.g., increase or decrease in the current set point temperature, magnitude of the adjustment. This determination is based on the sensor data 202 and the set point data 204. For example, as discussed above, the application server 150 measures the deviation between the measured user temperature within the sensor data 202 and the baseline user temperature and/or how the measured deviation may impact user comfort at the current set point temperature within the set point data 204.

In the example depicted in FIG. 2, the application server 150 determines that the current set point temperature within the set point data 204 should be reduced based on the high measured user temperature within the sensor data 202. In this example, the application server 150 determines, based on the heart rate within the sensor data 202, that the user 102 is exercising and may feel more comfortable if the temperature within the property 101 is lowered when he/she re-enters the property 101 after completing his/her workout. As shown, the application server 150 generates an instruction 206 that specifies a reduction in the current set point temperature by fifteen degrees Fahrenheit. The instruction 206 is then transmitted to the TRD 130.

At step "D," the TRD 130 adjusts the current set point temperature according to adjustment specified within the instruction 206, e.g., by a reduction in fifteen degrees Fahrenheit. Once adjusted, the TRD 130 sets the new set point temperature within the property 101 to 65 degrees Fahrenheit to cool down the air temperature within the property 101 before the user 102 re-enters the property 101. In this regard, the instruction 206 allows the TRD 130 to pre-cool the air temperature within the property 101 so that the user 102 does not feel overwhelmed by the air temperature within the property 101.

In some implementations, the set point adjustment, as depicted as being performed by the application server 150, can be performed locally by the control unit 110, the TRD 130, or a combination of both. In such examples, the sensor data 202 transmitted to the application server 150 is routed to the control unit 110 and/or the TRD 130 to evaluate whether a set point temperature adjustment is necessary. Additionally, the control unit 110 and/or the TRD 130 generates the instruction 206 to adjust the current set point temperature within the property 101.

Figure 3A:
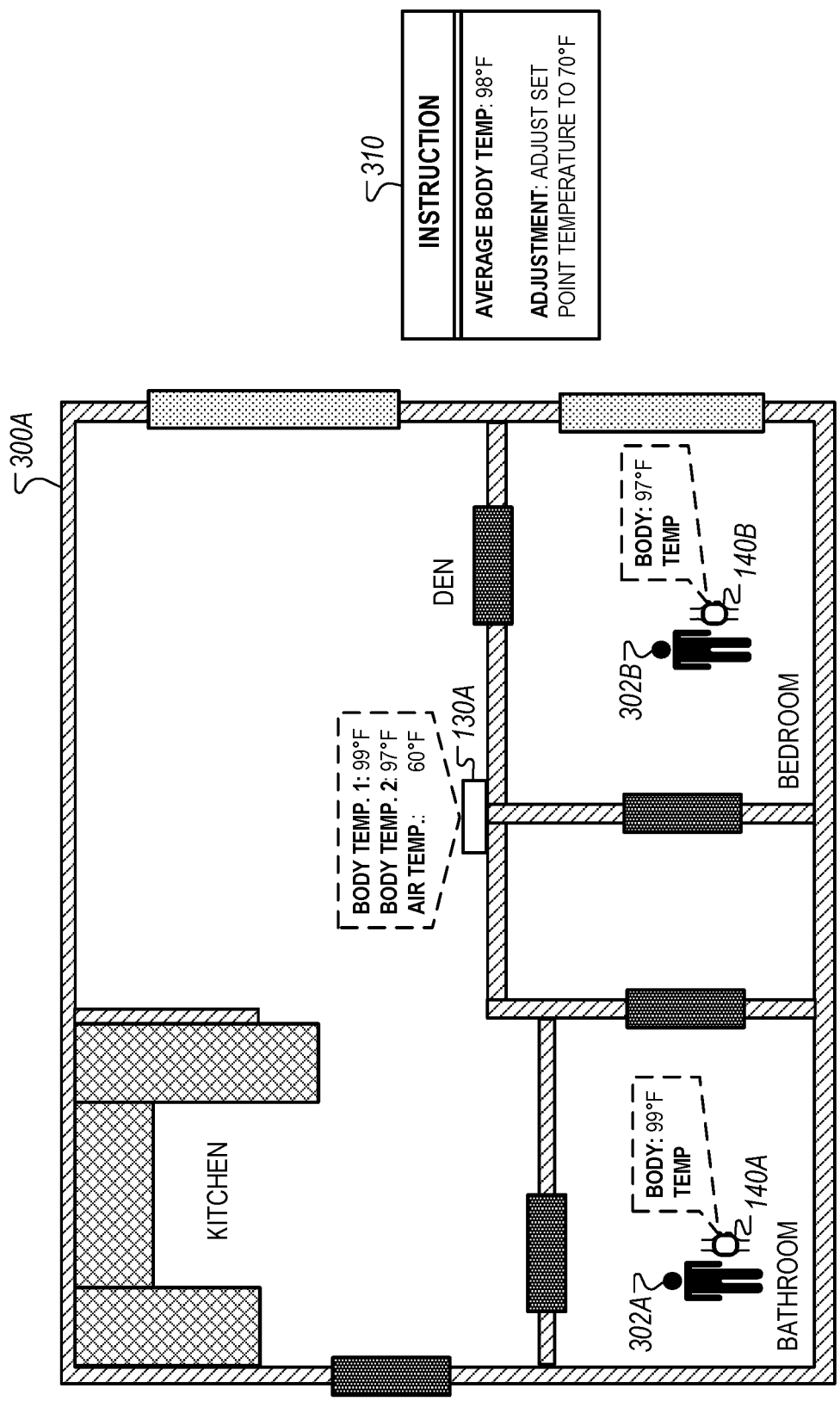
FIG. 3A illustrates an example of a property that includes a TRD that can be adjusted based on temperature data collected by WRTS of multiple users located within the property.

FIG. 3A illustrates an example of a property 300A that includes a TRD 130A that can be adjusted based on temperature data collected by WRTS 140A, 140B of multiple users located within the property 300A. In this example, multiple users that are concurrently located within the property 300A are associated with a different WRTS so that temperature sensitivities of the multiple users are accounted for when the system 100 adjusts the set point temperature as discussed throughout.

The TRD 130A exchanges communications with each of the WRTS 140A and 140B to regulate the interior temperature within the property 300A based on two sets of user temperature measurements. The TRD 130A also monitors an air temperature within the property 300A as discussed above. In the example depicted in FIG. 3A, the monitored data collected by the TRD 130 indicates that the user temperature measured for user 302A by the WRTS 140A is 97 degrees Fahrenheit, the user temperature measured for the user 302B by the WRTS 140B is 97 degrees Fahrenheit, and the current overall air temperature for the property 300A is 60 degrees Fahrenheit. In this example, the system 100 generates an instruction 310 that specifies a set temperature adjustment to 70 degrees Fahrenheit. This adjustment is based on averaging the two user temperatures measured by the WRTS 140A and 140B, and increasing the set point temperature by ten degrees Fahrenheit based on the average user temperature.

In some implementations, the system 100 can perform more complex set point adjustments based on multiple user measurements. In some instances, the system 100 may use user preferences to weigh individual user temperatures differently when computing an aggregate user temperature to use in adjusting the set point temperature for the property 300B. As an example, if the user data 152 indicates that the user 302A has lower temperature sensitivity than the user 302B, then the user temperature measured by the WRTS 140A can be assigned a greater weight compared to the user temperature measured by the WRTS 140B such that the user temperature for user 102A has a greater contribution to the aggregate user temperature than the user temperature for the user 102B. In another example, the system 100 may assign a greater weight to the user temperature for the user that has greater variance in historical measured user temperatures.

The example depicted in FIG. 3A illustrates an example of a set point temperature adjustment where the TRD 130 regulates a single region of a property. In other instances, such as the example depicted in FIG. 3B, where multiple regions within a property can be independently adjusted, the system 100 may adjust set point temperatures differently for each region. In some instances, the computation of the aggregate user temperature and/or the set point temperature adjustment can be based on data collected by the sensors 122, as discussed below with respect to FIG. 5.

Figure 3B:
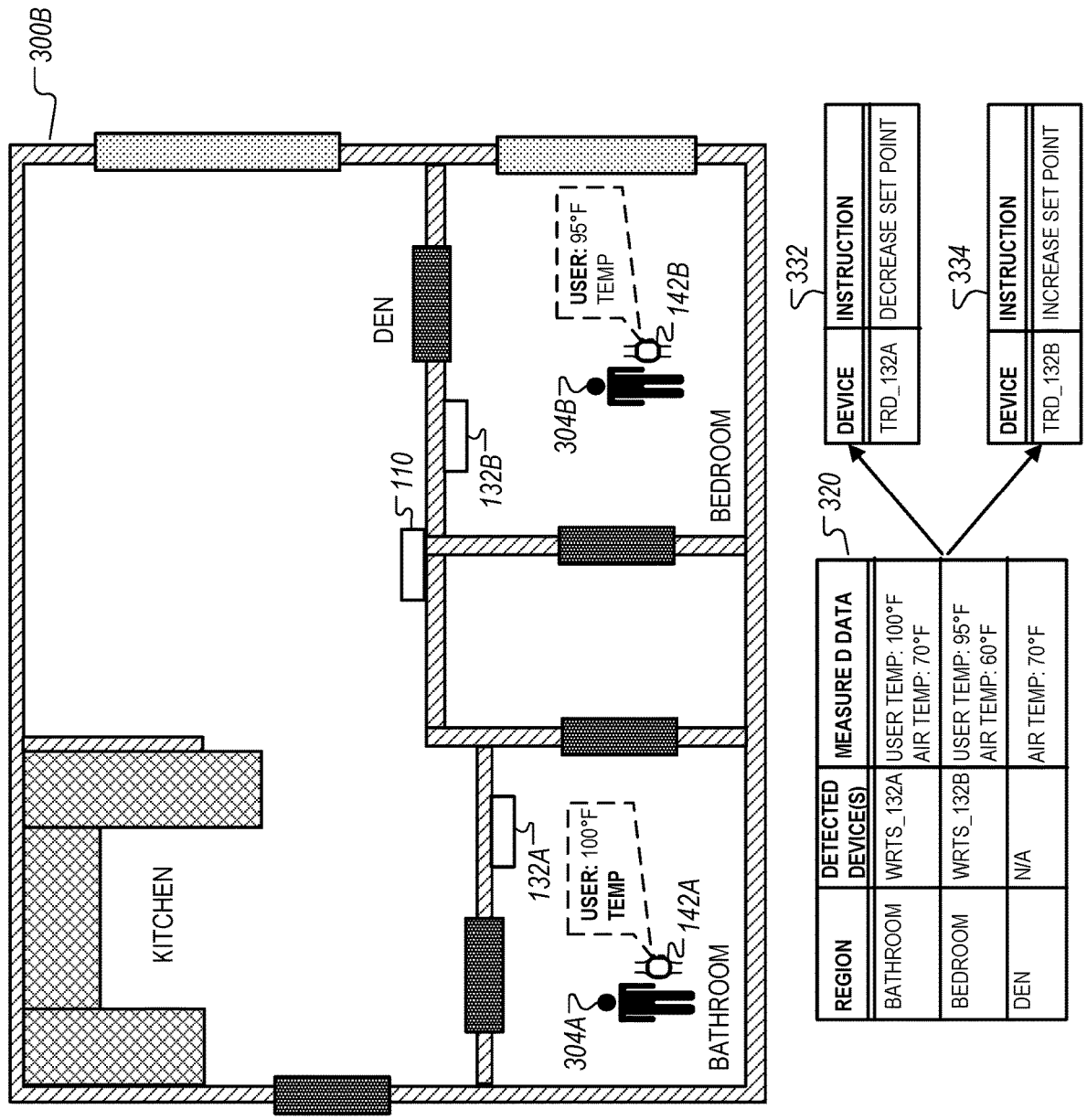
FIG. 3B illustrates an example of a property that includes multiple TRDs that can be independently adjusted based on temperature data collected by WRTS of multiple users located within the property.

FIG. 3B illustrates an example of a property 300B that includes multiple TRDs 132A and 132B that can be independently adjusted based on temperature data collected by WRTS 142A and 142B of multiple users 304A and 304B located within the property 300B. In this example, multiple users that are concurrently located within the property 300B are associated with a different WRTS. Additionally, the property 300B includes multiple TRDs 132A and 134B that each adjusts the set point temperature for a specific region within the property 300B. For example, TRD 132A adjusts the set point temperature for "BATHROOM" whereas TRD 132B adjusts the set point temperature for "BEDROOM."

The TRDs 132A and 132B exchange communications with the WRTS 142A and 142B, respectively to regulate the interior temperature within a corresponding region within the property 300B based on the user temperature measured by a WRTS located within the corresponding region. The TRDs 132A and 132B also monitor air temperature within the corresponding region within the property 300B.

The monitored data collected by the TRDs 132A and 132B are collected and stored within table 320. The table 320 identifies WRTS that are detected in each region with the property 300B, and the monitored data collected by the WRTS. In the example depicted in FIG. 3B, the WRTS 142A is detected within the region "BATHROOM" and the WRTS 142B is detected within the region "BEDROOM."

The system 100 can use various detection techniques to identify the present location of each WRTS. For example, in some implementations, the system 100 includes beacons that are each placed within a specified region and are configured to broadcast a message to a WRTS within a certain proximity of a beacon. In such implementations, once a WRTS is within a detectable range of a beacon, the WRTS receives the broadcasted message, which can then be transmitted to, for example, the control unit 110, to determine that the WRTS is located within a specified region of the property 300B including the beacon. In other implementations, each specified region within the property 300B includes a sensing device that is configured to initiate and maintain a connection event with a WRTS while it is within a detectable range of the sensing device. In such implementations, the connection event can be established using any suitable wireless communication protocol such as Bluetooth, IR, among others.

In the example depicted in FIG. 3B, the monitored data collected by the TRD 132A indicates that the user temperature measured for user 304A by the WRTS 142A is 100 degrees Fahrenheit. The monitored data collected by the TRD 132B indicates that the user temperature measured for user 304B by the WRTS 142B is 95 degrees Fahrenheit. In this example, the system 100 generates two instructions for each TRD—instruction 332 for the TRD 132A and instruction 334 for the TRD 132B. Each instruction is generated based on the user temperature and the air temperature measured within the specified region. For example, the instruction 332 specifies a decrease to the set point temperature within the "BATHROOM" region because the user temperature measured by the WRTS 142A indicates a high body temperature even though the measured air temperature within the region matches the set point temperature. Alternatively, the instruction 334 specifies an increase to the set point temperature within the "BEDROOM" region because the user temperature measured by the WRTS 142B and the current air temperature is low, indicating a high likelihood that the user 304B may be cold in the region of the property 300B.

Figure 4:
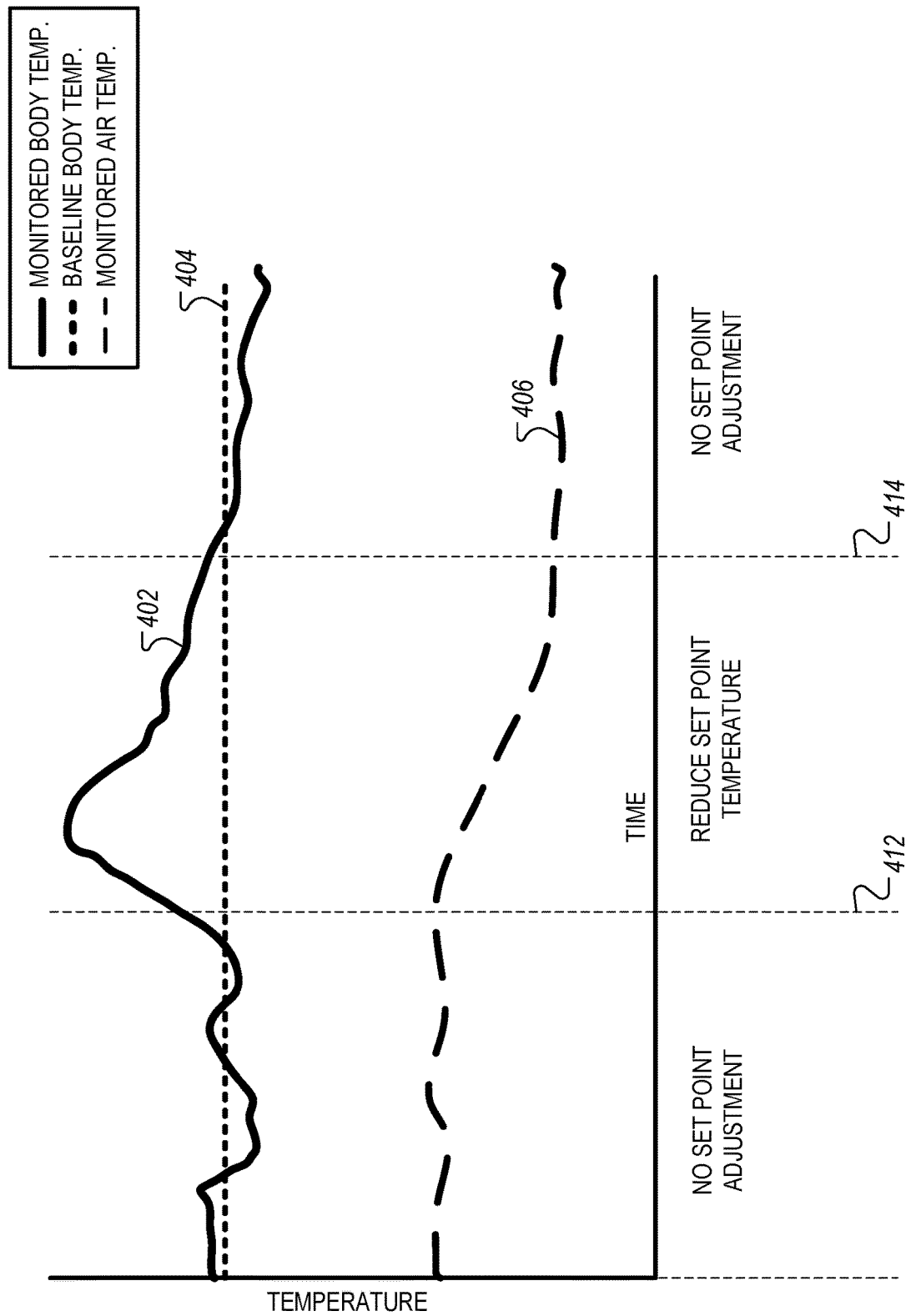
FIG. 4 illustrates an example of a chart representing a user temperature and air temperature monitored over a time period during which a set point adjustment is performed.

FIG. 4 illustrates an example of a chart 400 representing a user temperature 402 and air temperature 406 over a time period during which a set point adjustment is performed. In this example, the user temperature 402 and the air temperature 406 can be measured by the WRTS 140 and the TRD 130 as discussed above. The measurements can be made in real-time, or alternatively, periodically at a specified interval such as every thirty seconds.

In the example depicted in FIG. 4, the system 100 monitors changes in the user temperature 402 and the air temperature 406 to determine when to perform a set point temperature adjustment as discussed throughout. In particular, the system 100 monitors the difference between the measured user temperature for a user to a baseline temperature for the user as indicated by historical user temperature measurements. The system 100 also monitors the measured air temperature 406 to the present set point temperature.

The system 100 determines to perform a set point temperature adjustment at time point 412 when the difference between the measured user temperature 402 and the baseline temperature 404 exceeds a predetermined threshold. The system 100 then determines an appropriate adjustment using the techniques discussed above. For example, the system 100 determines that the present set point temperature should be decreased by recognizing that the measured user temperature 402 is increasing over time prior to and at the time point 412 when the set point temperature adjustment is determined.

Once the system 100 adjusts the set point temperature at time point 412, the HVAC system of a property is set to cooling mode to reduce the interior temperature of the property. As shown in the chart 400, this causes a slow decrease in the measured air temperature 406 as the cooling mode is enabled in response to set point temperature adjustment. At time point 414, the system 100 terminates the cooling operation of the HVAC system based on the measured user temperature 402 returning to the baseline temperature 404. This also causes the measured air temperature 406 to stabilize after time point 414.

Figure 5:
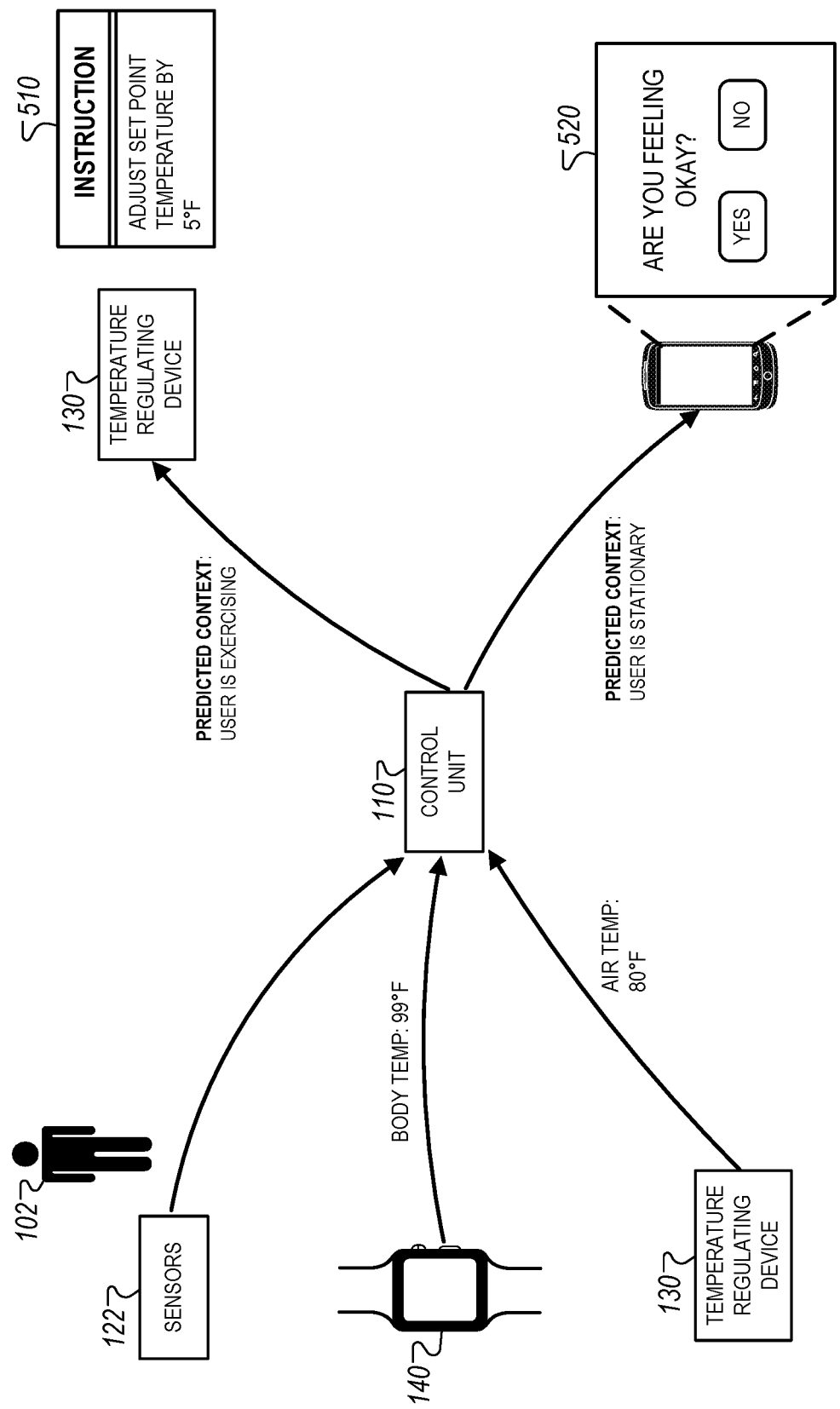
FIG. 5 illustrates an example of a technique for performing different operations based on input from multiple devices located within a property.

FIG. 5 illustrates an example of a technique for performing different operations based on input from multiple devices located within a property. In this example, the control unit 110 predicts a present context of the user 102 to contextualize temperature data collected by the WRTS 140. The control unit 110 uses the predicted context to determine the operation to perform in response to the temperature data, e.g., an excessively high or excessively low user temperature measured by the WRTS 140 relative to the baseline temperature. For example, as shown in FIG. 5, the control unit 110 performs two different operations in response to obtaining the temperature data based on the context predicted for the user 102.

As shown in FIG. 5, the control unit 110 determines a predicted context for the user 102 based on data collected by the sensors 122. In the first example, the control unit 110 predicts that the user 102 is presently exercising based on data collected by an activity sensor indicating a high heart and breathing rates. Alternatively, in the second example, the control unit 110 predicts that the user 102 is stationary based the motion data indicating limited movement within a region of the property.

In some implementations, the control unit 110 obtains data from other monitoring devices located within the property to verify a predicted context for the user 102 and reduce the likelihood of incorrectly predicting a present context of the user 102. For example, in such instances, the control unit 110 obtains video data collected by an indoor camera that shows that the user 102 is using an exercise machine in a home gym, occupancy data collected by an occupancy sensor that indicates that the user is presently occupying the home gym, or device data from a connected treadmill indicating that the device is presently being used.

The control unit 110 processes the data collected by the WRTS 140 and the TRD 130 according to the predicted context to determine the operation to be performed. In the first example, the control unit 110 determines that even though the measured user temperature is abnormally high compared to the baseline temperature for the user 102, the user 102 is not in danger because the high user temperature is explained by the user presently exercising. In this example, the control unit 110 transmits an instruction 510 to the TRD 130 to reduce the set point temperature by five degrees Fahrenheit in a similar manner as discussed above.

Alternatively, in the second example, the control unit 110 determines that the user 102 may be experiencing hyperthermia based on the predicted context indicating that the user is stationary (and the absence of other indicators that can cause high core temperature). In this example, the control unit 110 transmits a notification 520 to a user device of the user 102 to ask whether he/she is feeling okay in addition to adjusting the set point temperature as discussed above in the first example. In this regard, the control unit 110 uses the predicted context to identify possible causes for a high or low measured user temperature, which is then used to adjust how the system 100 responds to user temperature abnormalities.

FIG. 6 illustrates an example of a process 600 for adjusting a set point temperature of a property based on a user temperature measured by a WRTS. Briefly, the process 600 can include the operations of obtaining sensor data collected by a WRTS that indicates a temperature of a user (610), obtaining reference data indicating a predetermined baseline body temperature for the user (620), determining an adjustment to a set point temperature of a TRD of a property based on the sensor data and the reference data (630), and adjusting the set point temperature of the TRD according to the determined adjustment (640).

In more detail, the process 600 can include the operation of obtaining sensor data collected by a WRTS that indicates a measured temperature of a user (610). For example, the application server 150 can obtain sensor data collected by the WRTS 140 that indicates a user temperature measured for the user 102. As discussed above, the user temperature can be an outer temperature measured at the user's extremity, or alternatively, a core body temperature measured inside a cavity. In some implementations, the user temperature is inferred by the WRTS 140 based on applying regression-based techniques to measured biomarker levels that are correlated with user temperature, such as heart rate, breathing rate, perspiration level, among others.

The process 600 can include the operation of obtaining reference data indicating a predetermined baseline body temperature for the user (620). For example, the application server 150 can obtain reference data indicating a baseline temperature for the user 102. As discussed above, the baseline temperature can be determined based on monitoring the measured user temperature over a specified time period after the WRTS 140 is installed and/or based on soliciting feedback from the user 102. The baseline temperature represents an average temperature measured by the WRTS 140 for the user 102 during a resting activity. The reference data can also include user data 152 indicating the user's preferences for the interior temperature for a property, the user's temperature sensitivities, or other types of information that impacts how the user perceives temperature within the property.

The process 600 can include the operation of determining an adjustment to a set point temperature of a TRD of a property based on the sensor data and the reference data (630). For example, the application server 150 determines a specific type of set point temperature adjustment based on the data collected by the TRD 130 and WRTS 140 and the reference data. As discussed above, the adjustment can be determined based on applying a set of rules that each specify triggers and/or conditions associated with the sensor data and specifies a corresponding adjustment. For example, if the measured user temperature exceeds a certain threshold difference from the reference temperature for the user 102, then the application server 150 may determine to adjust the set point temperature regardless of the air temperature. In another example, if the measured air temperature exceeds a certain threshold difference from the present set point temperature, then the application server 150 may similarly determine to adjust the set point temperature regardless of the user temperature. In some other examples, the application server 150 determines the type of adjustment, e.g., increase/decrease, magnitude of adjustment, based on evaluating the triggers and/or conditions of rules included within the rule repository 154.

In some implementations, the set point temperature adjustment can additionally be based on data collected by the sensors 122 indicating a present condition within the property 101. For example, as shown in FIG. 5, the sensor data can be used to identify a predicted context for the user 102 and associated with measured user temperature. In such examples, the predicted context can be used to perform different type of set point temperature adjustments for the same measured user temperature, depending on the predicted context. For instance, a set point temperature can be adjusted more aggressively if the user is not detected to be sweating than if the user is detected to be sweating.

The process 600 can include the operation of adjusting the set point temperature of the TRD according to the determined adjustment (640). For example, the application server 150 can adjust the set point temperature according a rule within the rule repository 154 having triggers and/or conditions that are satisfied by the measured user temperature and/or air temperature.

FIG. 7 illustrates an example of a process 700 for adjusting a set point temperature based on a current body temperature of a user and a reference body temperature of the user. Briefly, the operations of the process 700 can include the operations of determining that a user is located within a property (710), obtaining a current body temperature of a user (720), obtaining a reference body temperature of the user (730), determining an adjustment to a set point temperature of a temperature regulating device located within the property (740), and providing an instruction that causes the temperature regulating device to adjust the set point temperature in accordance with the determined adjustment (750).

In general, the process 700 is described below in reference to the system 100, although other types of property monitoring systems can be configured to perform the operations of the process 700. For example, a property monitoring system that includes a thermostat, one or more associated sensors, and a temperature sensing device worn by a user can be configured to monitor a user's body temperature in relation to a reference body temperature as discussed in detail below.

In some implementations, the operations of the process 700 are executed by one or more components of the system 100. For example, the WRTS 140 can monitor a body temperature of the user 102, and the control unit 110 can adjust the set point temperature of the TRD 130 based on comparing the monitored body temperature to a reference body temperature and based on the rules included in the rule repository 154. In this example, the control unit 110 locally adjusts the set point temperature of the TRD 130. In other examples, the server 150 can remotely monitor the body temperature measured by the WRTS 140 and either directly configure the TRD 130, e.g., through a network-based communication, or configure the TRD 130 through the control unit 110. In such examples, the server 150 can use different types of monitoring techniques to adjust the operation of the TRD 130, e.g., adjusting the set point temperature based on prior adjustments to the TRD 130 or adjusting the set point temperature based on prior adjustments to TRDs of other properties that are similar to the property 101. The descriptions below focus on the control unit 110 performing the operations of the process 700.

In more detail, the process 700 can include the operation of determining that a user is located within a property (710). For example, the server 150 determines that the user 102 is located in the property 101. The server 150 can make this determination based processing sensor data collected by the sensors 122. For example, the server 150 can obtain activity data and/or presence data associated with the interior environment of the property 101 that indicates that the user 102 or a computing device of the user 102, e.g., a smartphone, tablet, or laptop computing device, is presently located in the property 101. In another with example, the server 150 can obtain video data of the exterior of a front door collected by a security camera of the property 101. In this example, the video data can indicate that the user 102 has recently entered the property 101 through the front entrance, which the server 150 can use to determine that the user 102 is located in the property 101.

In some implementations, the server 150 determines that the user 102 is located in the property 101 based on determining that the user 102 has recently crossed a geo-fence associated with the property 101. For example, as shown in FIG. 2, the server 150 can determine that the user 102 is located in the property 101 based on detecting that the user 101 has recently crossed the geo-fence 210. As discussed above, the time period after which the user 102 is determined to be in the property 101 can be based on the size of the geo-fence 210. For example, the server 150 can use a diameter of the geo-fence 210 to predict a time that it takes for the user 102 to enter the property 101 after crossing the geo-fence 210.

The process 700 can include the operation of obtaining a current body temperature of a user (720). For example, the server 150 can obtain a current body temperature of the user 102 that is measured by the WRTS 140 in response to the determination that the user 102 is located in the property 101. As discussed above, the current body temperature can be measured by the WRTS 140 on a periodic basis, e.g., every five minutes, every hour, every daily, etc. The current body temperature can be used by the server 150 to predict the user's comfort level as it relates to the current air temperature of the interior environment of the property 101. For example, a current body temperature that is greater than a reference body temperature for the user 102 can be used to predict that the user 102 feels hot. Alternatively, a current body temperature that is lower than the reference body temperature for the user 102 can be used to predict that the user 102 feels cold.

The process 700 can include the operation of obtaining a reference body temperature of the user (730). For example, the server 150 can obtain a reference body temperature of the user 102 that is indicated by historical temperature data collected for the user 102. As discussed above, the historical temperature data collected for the user 102 can include previous body temperature measurements collected by the WRTS 140 over a certain time period and used to establish a reference body temperature. For example, the WRTS 140 can collect body temperature measurements for the user 102 during an initial week time frame after the user 102 initially configures the WRTS 140.

In some instances, the reference body temperature for the user 102 can be adjusted over time based on the WRTS 140 performing periodic measurements that are used to establish a dynamic reference body temperature. For example, the WRTS 140 can compute a new reference body temperature at the start of each new season. In this example, the WRTS 140 can compute a reference body temperature at the start of a certain month coinciding to a seasonal change, e.g., computing a reference body temperature for the Fall season by collecting body temperature measurements in the first week of September. In other examples, the reference body temperature can be re-computed based on other factors, such as changes in user activity patterns, changes to the ambient temperature within the property 101, among others. For instance, if the user 102 is identified as recently starting a new exercise regimen, then the WRTS 140 can compute a new reference body temperature.

In some implementations, the WRTS 140 computes multiple reference body temperatures for the user 102 that are each mapped to a different user activity. For example, the WRTS 140 can compute a reference body temperature for time periods when the user 102 is determined to be exercising, and another reference body temperature for time periods when the user 102 is determined to be inactive, e.g., sleeping, or watching television. In such implementations, the reference body temperature can be used to contextualize the body temperature analysis techniques described herein with respect to a specific activity being performed by the user, thereby allowing the server 150 to adjust the set point temperature of the TRD 130 based on the specific activity.

The process 700 can include the operation of determining an adjustment to a set point temperature of a temperature regulating device located within the property (740). For example, the server 150 can determine an adjustment to a set point temperature of the TRD 130 based on the current body temperature and the reference body temperature of the user 102. As discussed above, the server 150 can perform the adjustment automatically without any input from user 102. The type of adjustment can be based on a comparison of the current body temperature and the reference body temperature for the user 102. For example, if the reference body temperature is greater than the current body temperature, then the server 150 can increase the set point temperature of the TRD 130 to increase the air temperature inside the property 101. Alternatively, if the current body temperature is greater than the reference body temperature, then the server 150 can decrease the set point temperature of the TRD 130 to decrease the air temperature inside the property 101.

In some implementations, the server 150 determines the adjustment to the set point temperature of the TRD 130 based on comparing the reference body temperature and the current body temperature of the user 102. For example, the server 150 can determine a temperature difference between the reference body temperature and the current body temperature.

The server 150 can then compare the temperature difference to a predetermined threshold to determine whether the set point temperature should be adjusted. For example, the server 150 can determine that an adjustment should be made if the temperature difference satisfies the predetermined threshold but that no adjustment should be made if the temperature difference does not satisfy the threshold. For instance, if the threshold is three degrees, then the server 150 can determine that an adjustment should be made if a value of the current body temperature exceeds a value of the reference body temperature by five degrees or if a value of the current body temperature is lower than five degrees than a value of the reference body temperature.

In some implementations, the threshold used by the server 150 to determine whether the set point temperature of the TRD 130 should be adjusted is empirically determined based on activity patterns of the user 102 that are specified within historical temperature data collected for the user 102. The threshold can be customized for the user 102 based on input provided by the user 102 indicating a user's preferred temperature comfort level. For example, during an initial configuration process, e.g., during a time period when the WRTS 140 determines the reference body temperature for the user 102, the server 150 can evaluate the user's sensitivity to temperature variations.

During the initial configuration process, the user 102 can be requested to provide input representing his/her preference, e.g., whether he/she feels cold or whether he/she finds the present temperature comfortable. The collected input data can then be used to determine temperature sensitivity of the user 102, which is then used to adjust the threshold. For example, the server 150 can use a low threshold, e.g., 0.1 degrees, for a user with high temperature sensitivity so that smaller variations between the reference and current body temperatures of the user can trigger set point temperature adjustment. In contrast, the server 150 can use a high threshold, e.g., 0.5 degrees, for a user low temperature sensitivity so that larger variations are needed to trigger set point temperature adjustment.

In some instances, the server 150 can determine threshold based on other types of activity data representing a user's temperature sensitivity that is not explicitly received from the user. For example, the server 150 can monitor a user's activity in relation to an air temperature and infer, based on the user's activity, whether the user has a preference and/or distaste for certain temperatures. In this example, a user manually adjusting the set point temperature may indicate that the user does not prefer a current air temperature, and in contrast, time periods during which there are minimal or no set point temperature adjustments can represent a user's preference for air temperature during the time periods.

In some implementations, the server 150 determines the adjustment to the set point temperature of the TRD 130 based on monitoring air temperature within the property 101 and determining the set point adjustment accordingly based on an adjustment to the monitored air temperature. In such implementations, the server 150 can identify a current air temperature for an interior environment of the property 101 and determine an adjustment to the current air temperature based on the temperature difference between the current body temperature and the reference body temperature for the user 102. For example, the server 150 can identify that the current air temperature within the property 101 is 78 degrees Fahrenheit and determine that the temperature difference indicates that the current body temperature exceeds the reference body temperature of the user 102 by 0.5 degrees Fahrenheit.

The server 150 can reduce the air temperature by five degrees, i.e., to 73 degrees Fahrenheit, based on the 0.5 degree difference between the current and reference body temperatures. In this example, the magnitude of adjustment and the type of adjustment, e.g., increasing or decreasing air temperature, is based on the magnitude and type of temperature difference between the current and reference body temperature, e.g., whether the current body temperature greater or lower than the reference body temperature.

In some instances, the value to adjust the air temperature can be correlated with the temperature difference between the current and reference body temperatures of the user 102. The server 150 can apply a specified multiplier, e.g., double, quadruple, etc., or use some specified algorithmic technique, to compute the air temperature adjustment based on the temperature difference. For example, the server 150 can determine the air temperature adjustment based on evaluating multiple factors, such as prior set point temperature adjustments, magnitude and type of temperature difference, time of day, present activity within the property 101, among others.

The process 700 can include the operation of providing an instruction that causes the temperature regulating device to adjust the set point temperature in accordance with the determined adjustment (750). For example, the server 150 can provide an instruction for output to the TRD 130. The instruction, when received by the TRD 130, can cause the TRD 130 adjust the set point temperature in accordance with the instruction. In some instances, the instruction can specify a certain value to increase or decrease the set point temperature based on a value representing a temperature difference between the reference body temperature and the current body temperature.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
   determining that a user is located within a property;
   based on the determination that the user is located within the property:
   obtaining a current body temperature of the user measured by a temperature sensor worn by the user, and
   obtaining a reference body temperature of the user indicated by historical temperature data collected for the user;
   determining, based on the current body temperature and the reference body temperature, an adjustment to a set point temperature of a thermostat located within the property; and
   providing, for output to the thermostat, an indication that, when received, causes the thermostat to adjust the set point temperature of the thermostat in accordance with the determined adjustment.

2. The method of claim 1, wherein determining the adjustment to the set point temperature of the thermostat located within the property comprises:
   determining a temperature difference between the reference body temperature and the current body temperature; and
   determining that the temperature difference between the reference body temperature and the current body temperature satisfies a predetermined threshold.

3. The method of claim 2, wherein the predetermined threshold is empirically determined based on activity patterns of the user specified within the historical temperature data collected for the user.

4. The method of claim 2, wherein determining the adjustment to the set point temperature of the thermostat located within the property comprises:
   identifying a current air temperature for an interior environment of the property; and
   determining, based on the current air temperature and the temperature difference between the current body temperature and the reference body temperature, an adjustment to the current air temperature for the interior environment of the property.

5. The method of claim 4, wherein:
   determining that the temperature difference between the reference body temperature and the current body temperature satisfies the predetermined threshold comprises determining that the current body temperature exceeds the reference body temperature by a first value specified by the predetermined threshold;
   determining the adjustment to the current air temperature for the interior environment of the property comprises determining, based on the first value specified by the predetermined threshold, a second value to adjust the current air temperature of the interior environment of the property; and
   the indication that, when received, causes the thermostat to reduce the set point temperature of the thermostat by the second value.

6. The method of claim 4, wherein:
   determining that the temperature difference between the reference body temperature and the current body temperature satisfies the predetermined threshold comprises determining that the reference body temperature exceeds the current body temperature by a first value specified by the predetermined threshold;
   determining the adjustment to the current air temperature for the interior environment of the property comprises determining, based on the first value specified by the predetermined threshold, a second value to adjust the current air temperature of the interior environment of the property; and
   the indication that, when received, causes the thermostat to increase the set point temperature of the thermostat by the second value.

7. The method of claim 1, further comprising:
   obtaining sensor data collected by one or more sensors located within the property, the sensor data indicating activity information of the user during a time period in which the current body temperature of the user is measured by the temperature sensor worn by the user;
   determining, based on the activity information of the user during the time period in which the current body temperature of the user is measured by the temperature sensor worn by the user, a predicted context of the user within the property; and
   providing, based on the predicted context of the user within the property, a communication for output to a computing device of the user.

8. The method of claim 1, wherein:
   determining that the user is located within the property comprises determining that the user has crossed a geo-fence associated with the property; and
   the current body temperature and the reference body temperature are obtained in response to the determination that the user has crossed the geo-fence associated with the property.

* * * * *